United States Patent
Yang et al.

(10) Patent No.: US 7,634,139 B2
(45) Date of Patent: Dec. 15, 2009

(54) SYSTEM AND METHOD FOR EFFICIENTLY PERFORMING A PATTERN MATCHING PROCEDURE

(75) Inventors: Chinping Yang, Cupertino, CA (US); Robert Du, Danville, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 815 days.

(21) Appl. No.: 10/802,088

(22) Filed: Mar. 16, 2004

(65) Prior Publication Data

US 2005/0207651 A1     Sep. 22, 2005

(51) Int. Cl.
G06K 9/62 (2006.01)
H03M 7/16 (2006.01)
H03M 7/04 (2006.01)

(52) U.S. Cl. ............... 382/209; 382/278; 341/97; 341/105

(58) Field of Classification Search ........... 382/209
See application file for complete search history.

(56) References Cited

U.S. PATENT DOCUMENTS

| | | | | |
|---|---|---|---|---|
| 3,074,634 A | * | 1/1963 | Gamo | 235/462.01 |
| 3,679,821 A | * | 7/1972 | Schroeder | 375/240.12 |
| 4,208,651 A | * | 6/1980 | McMahon | 382/125 |
| 4,393,276 A | * | 7/1983 | Steele | 380/28 |
| 4,402,075 A | * | 8/1983 | Bargeton et al. | 370/246 |
| 4,558,462 A | * | 12/1985 | Horiba et al. | 382/275 |
| 4,626,854 A | * | 12/1986 | Kretschmer et al. | 342/196 |
| 4,998,286 A | * | 3/1991 | Tsujiuchi et al. | 382/165 |
| 5,109,428 A | * | 4/1992 | Igaki et al. | 382/125 |
| 5,148,316 A | * | 9/1992 | Horner et al. | 359/561 |
| 5,485,312 A | * | 1/1996 | Horner et al. | 359/561 |
| 5,703,970 A | * | 12/1997 | Atashroo | 382/278 |
| 5,712,912 A | * | 1/1998 | Tomko et al. | 713/186 |
| 5,878,157 A | * | 3/1999 | Mukohzaka | 382/124 |
| 5,903,648 A | * | 5/1999 | Javidi | 380/54 |

(Continued)

OTHER PUBLICATIONS

Mehrad Yasrebi, G.J. Lipovski, A state-of-the-art SIMD two-dimensional FFT array processor, Jan. 1984, ACM Press, ACM SIGARCH Computer Architecture News, Proceedings of the 11$^{th}$ annual international symposium on Computer architecture ISCA '84, vol. 12, Issue 3, pp. 21-27.*

(Continued)

Primary Examiner—Sath V Perungavoor
(74) Attorney, Agent, or Firm—Gregory J. Koerner; Redwood Patent Law (57) ABSTRACT

A system and method for efficiently performing a pattern matching procedure includes an enrollment manager that performs an image conversion procedure for converting an initial reference image into a reference template. The image conversion procedure may include at least one of a binarization procedure and a symmetrical reduction procedure to more efficiently utilize system resources such as processing requirements and memory requirements. A verification manager may then convert an initial test image into a transformed test image for combining with the foregoing reference template to produce a correlation image. The verification manager then analyzes matching characteristics of the correlation image to determine whether the initial test image matches the initial reference image.

20 Claims, 9 Drawing Sheets

U.S. PATENT DOCUMENTS

| | | | | |
|---|---|---|---|---|
| 6,078,265 | A | 6/2000 | Bonder et al. | 340/5.23 |
| 6,163,403 | A * | 12/2000 | Carrott et al. | 359/561 |
| 6,185,320 | B1 * | 2/2001 | Bick et al. | 382/132 |
| 6,219,794 | B1 * | 4/2001 | Soutar et al. | 726/18 |
| 6,404,917 | B1 * | 6/2002 | Kondo et al. | 382/166 |
| 6,519,340 | B1 * | 2/2003 | Javidi | 380/28 |
| 6,999,629 | B1 * | 2/2006 | Lechat et al. | 382/240 |
| 2004/0028261 | A1 * | 2/2004 | Tufvesson | 382/124 |
| 2004/0215615 | A1 * | 10/2004 | Larsson et al. | 382/115 |
| 2005/0018925 | A1 * | 1/2005 | Bhagavatula et al. | 382/278 |
| 2006/0050986 | A1 * | 3/2006 | New et al. | 382/280 |
| 2006/0133647 | A1 * | 6/2006 | Werner et al. | 382/100 |

OTHER PUBLICATIONS

Bruce D. Hansche, J. Jeff Mason, Fred M. Dickey, Quad-phase-only filter implementation, Nov. 1989, Optical Society of America (OSA), Applied Optics, vol. 28, No. 22, pp. 4840-4844.*

Joseph L. Horner, Harmut O. Bartelt, Two-Bit Correlation, Sep. 1985, Optical Society of America (OSA), Applied Optics, vol. 24, No. 18, pp. 2889-2893.*

A Wrapper for Look-Up Tables (LUT) Operations in C++, Mochima. com, archived website www.mochima.com/articles/LUT/LUT. html,archived on Feb. 1, 2001 by the Wayback Machine at www. archive.org, pages numbered as 1-10.*

Kenneth R. Castleman, Digital Image Processing, 1996, Prentice Hall, Inc. 1st edition, pp. 194-195.*

McGillem & Cooper, Continuous & Discrete Signal and Systems Analysis, 1991, Saunders College Publishing, 3rd edition, p. 142.*

* cited by examiner

Multiplication
Look-Up Table: 510

| | | | | | 522(a) |
|---|---|---|---|---|---|
| 514(a) | Reference Pixel Value (1 + j) | Table Value | Table Value | Table Value | Table Value |
| 514(b) | Reference Pixel Value (1 - j) | Table Value | Table Value | Table Value | Table Value |
| 514(c) | Reference Pixel Value (-1 + j) | Table Value | Table Value | Table Value | Table Value |
| 514(d) | Reference Pixel Value (-1 - j) | Table Value | Table Value | Table Value | Table Value |
| | | Test Pixel Value (1 + j) | Test Pixel Value (1 - j) | Test Pixel Value (-1 + j) | Test Pixel Value (-1 - j) |
| | | 518(a) | 518(b) | 518(c) | 518(d) |

SYSTEM AND METHOD FOR EFFICIENTLY PERFORMING A PATTERN MATCHING PROCEDURE

BACKGROUND SECTION

1. Field of Invention

This invention relates generally to techniques for analyzing electronic data, and relates more particularly to a system and method for efficiently performing a pattern matching procedure.

2. Description of the Background Art

Implementing efficient methods for analyzing electronic data is a significant consideration for designers and manufacturers of contemporary electronic devices. However, efficiently analyzing data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced analysis operations may provide additional benefits to a system user, but may also place increased demands on the control and management of various device components. For example, an enhanced electronic device that efficiently analyses and manipulates digital image data may benefit from an efficient implementation because of the large amount and complexity of the digital data involved.

Due to growing demands on system resources and substantially increasing data magnitudes, it is apparent that developing new techniques for analyzing electronic data is a matter of concern for related electronic technologies. Therefore, for all the foregoing reasons, developing efficient systems for analyzing electronic data remains a significant consideration for designers, manufacturers, and users of contemporary electronic devices.

SUMMARY

In accordance with the present invention, a system and method are disclosed for efficiently performing a pattern matching procedure. In one embodiment, during an enrollment procedure, an enrollment manager obtains an initial reference image from any appropriate source. In certain embodiments, the initial reference image may correspond to a given individual's fingerprint or face.

The enrollment manager may then perform a Fast Fourier Transform (FFT) procedure to convert the initial reference image (having individual pixels expressed as real numbers in the spatial domain) into an FFT reference image (having individual pixel values expressed as complex numbers in the frequency domain). In certain embodiments, the enrollment manager may perform a binarization procedure to convert the complex pixel values (with both real and imaginary values) from the FFT reference image into corresponding binarized pixel values of a binarized reference image.

In a first binarization step, in order to conserve system resources such as processing requirements and memory requirements, the enrollment manager may substitute a decimal value of "1" for all complex coefficients greater than or equal to zero, and may also substitute a decimal value of "−1" for all complex coefficients less than zero. The foregoing initial binarization values may then be utilized for any further calculations during the pixel matching procedure.

In a second binarization step, for purposes of conserving memory resources, the enrollment manager may create stored binarization values by substituting a binary value of "1" for all complex coefficients of the initial binarization values that are equal to "−1", and also by substituting a binary value of "0" for all complex coefficients of the initial binarization values that are equal to "1". Each of the complex coefficients may thus efficiently and effectively be expressed with a single binary bit.

Due to properties of data subject to Fast Fourier Transforms, the foregoing binarized reference image exhibits symmetrical characteristics across the complex pixel values. In certain embodiments, in order to conserve system resources such as processing requirements and memory requirements, the enrollment manager may perform a symmetrical reduction procedure on the binarized reference image to produce a reduced reference image. For example, in certain embodiments, a large portion of the right-hand pixels from the binarized reference image may be discarded before the binarized reference image is stored as a reference template.

In certain embodiments, during a verification procedure, a verification manager obtains an initial test image from any appropriate source. In certain embodiments, the initial test image may correspond to a given individual's fingerprint or face that is captured for comparison with the foregoing reference template for purposes of verifying that individual's identity.

The verification manager may perform a Fast Fourier Transform (FFT) procedure to convert the initial test image (having individual pixels expressed as real numbers in the spatial domain) into an FFT test image (having individual pixel values expressed as complex numbers in the frequency domain). As discussed above, due to properties of data subject to Fast Fourier Transforms, the FFT test image exhibits symmetrical characteristics across the complex pixel values.

In certain embodiments, in order to conserve system resources such as processing requirements and memory requirements, the verification manager may perform a symmetrical reduction procedure on the FFT test image to produce a reduced test image. For example, in certain embodiments, a large portion of the right-hand pixels of the FFT test image may be discarded before the FFT test image is stored.

The verification manager then performs a multiplication procedure by multiplying corresponding complex pixel values from the reference template and the reduced test image to produce a reduced FFT correlation image. In certain embodiments, the verification manager may efficiently utilize a multiplication lookup table to perform the foregoing multiplication procedure. The verification manager may perform a symmetrical regeneration procedure to regenerate a full FFT correlation image from the reduced FFT correlation image.

Next, the verification manager may perform an inverse FFT procedure to convert the FFT correlation image (in the frequency domain) into a final correlation image (in the spatial domain). In certain embodiments, the verification manager may then discard all imaginary portions of the pixel values from the final correlation image to produce a real correlation image. The verification manager may also perform an FFT shift procedure upon pixels from the real correlation image to center a pixel magnitude peak of a corresponding correlation graph.

The verification manager may then compute a peak sidelobe ratio (PSR) value that represents a relative amount of correlation between a given initial reference image and a given initial test image. If the foregoing PSR is over a predetermined verification threshold value, then the verification manager may approve the particular test image as a pattern match for the corresponding initial reference image to complete the pattern matching procedure. The foregoing techniques therefore provide an improved system and method for efficiently performing a pattern matching procedure, in accordance with the present invention.

DETAILED DESCRIPTION

The present invention relates to an improvement in data analysis techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently performing a pattern matching procedure, and may include an enrollment manager that performs an image conversion procedure for converting an initial reference image into a reference template. The image conversion procedure may include at least one of a binarization procedure and a symmetrical reduction procedure to more efficiently utilize system resources such as processing requirements and memory requirements. A verification manager may then convert an initial test image into a transformed test image for combining with the foregoing reference template to produce a correlation image. The verification manager then analyzes matching characteristics of the correlation image to determine whether the initial test image matches the initial reference image Referring now to FIG. 1, a block diagram for one embodiment of an electronic device 110 is shown, in accordance with the present invention. In the FIG. 1 embodiment, electronic device 110 may include, but is not limited to, a control module 114, a capture subsystem 118, a system bus 138, and a display 134. In the FIG. 1 embodiment, capture subsystem 118 may be optically coupled to a target object, and may also be electrically coupled via system bus 138 to control module 114.

Figure 1:
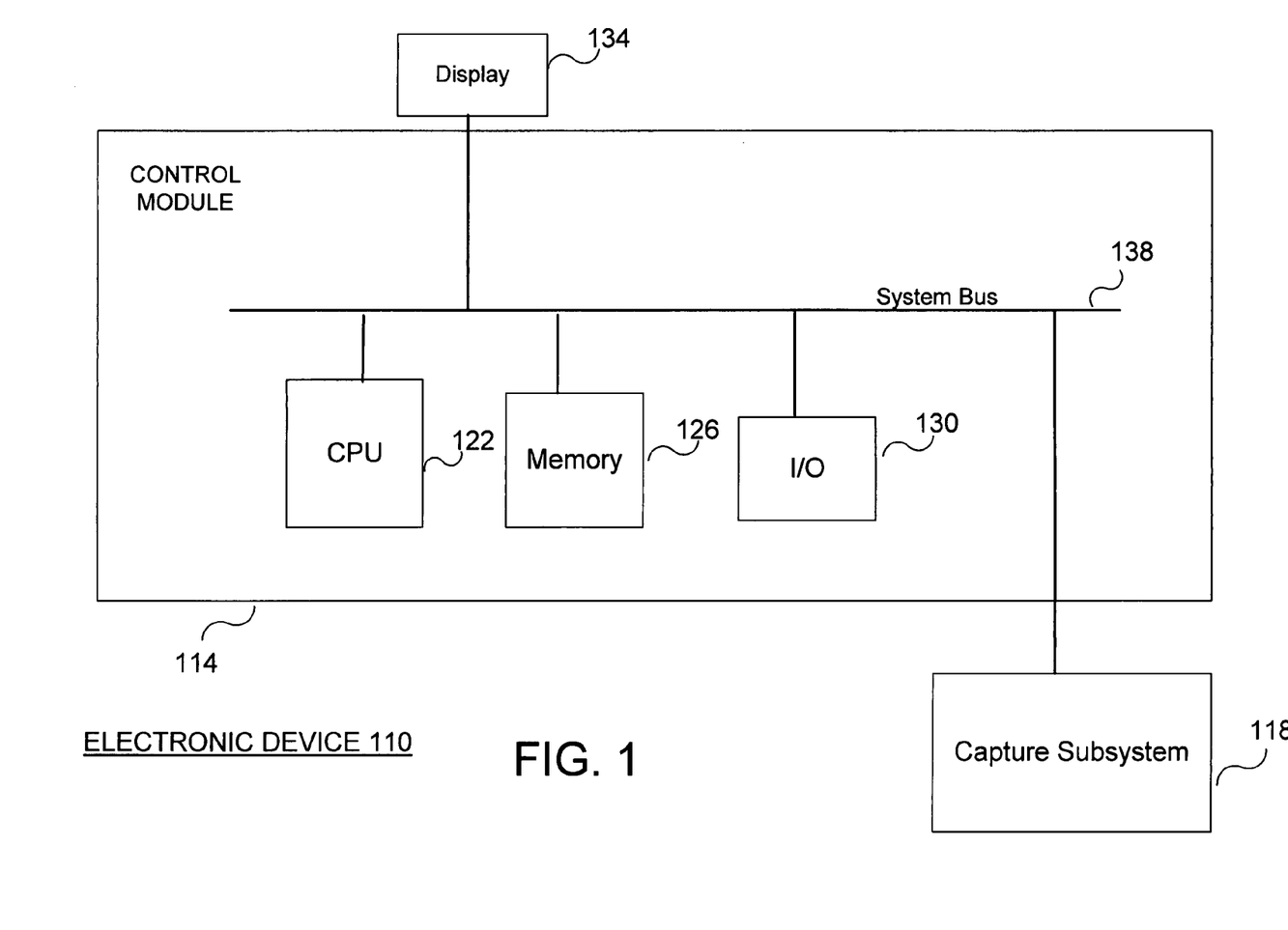
FIG. 1 is a block diagram for one embodiment of an electronic device, in accordance with the present invention.

In alternate embodiments, electronic device 110 may readily include various other components in addition to, or instead of, those components discussed in conjunction with the FIG. 1 embodiment. In addition, the present invention may be embodied in any appropriate type of electronic device. For example, electronic device 110 may readily be implemented as a computer, an image scanner device, a camera device, or an electronic security device.

In the FIG. 1 embodiment, control module 114 may include, but is not limited to, a central processing unit (CPU) 122, a memory 126, and one or more input/output interface(s) (I/O) 130. CPU 122, memory 126, and I/O 130 preferably are each coupled to, and communicate, via common system bus 138 that also communicates with capture subsystem 118. In alternate embodiments, control module 114 may readily include various other components in addition to, or instead of, those components discussed in conjunction with the FIG. 1 embodiment.

In the FIG. 1 embodiment, CPU 122 may be implemented to include any appropriate microprocessor device. Alternately, CPU 122 may be implemented using any other appropriate technology. For example, CPU 122 may be implemented to include certain application-specific integrated circuits (ASICs) or other appropriate electronic devices. Memory 126 may be implemented as one or more appropriate storage devices, including, but not limited to, read-only memory, random-access memory, and various types of non-volatile memory, such as floppy disc devices, hard disc devices, or flash memory. I/O 130 may provide one or more effective interfaces for facilitating communications between electronic device 110 and any external entity, including a system user or another electronic device. I/O 130 may be implemented using any appropriate input and/or output devices.

In the FIG. 1 embodiment, capture subsystem 118 may include, but is not limited to, an image sensor that captures image data corresponding to a target object via reflected light impacting the image sensor along an optical path. The image sensor, which may include a charge-coupled device (CCD), may responsively generate a set of image data representing the target object. The image data may then be routed over system bus 138 to control module 114 for appropriate processing and storage. The functionality and implementation of electronic device 110 are further discussed below in conjunction with FIGS. 2-8B.

Figure 2:
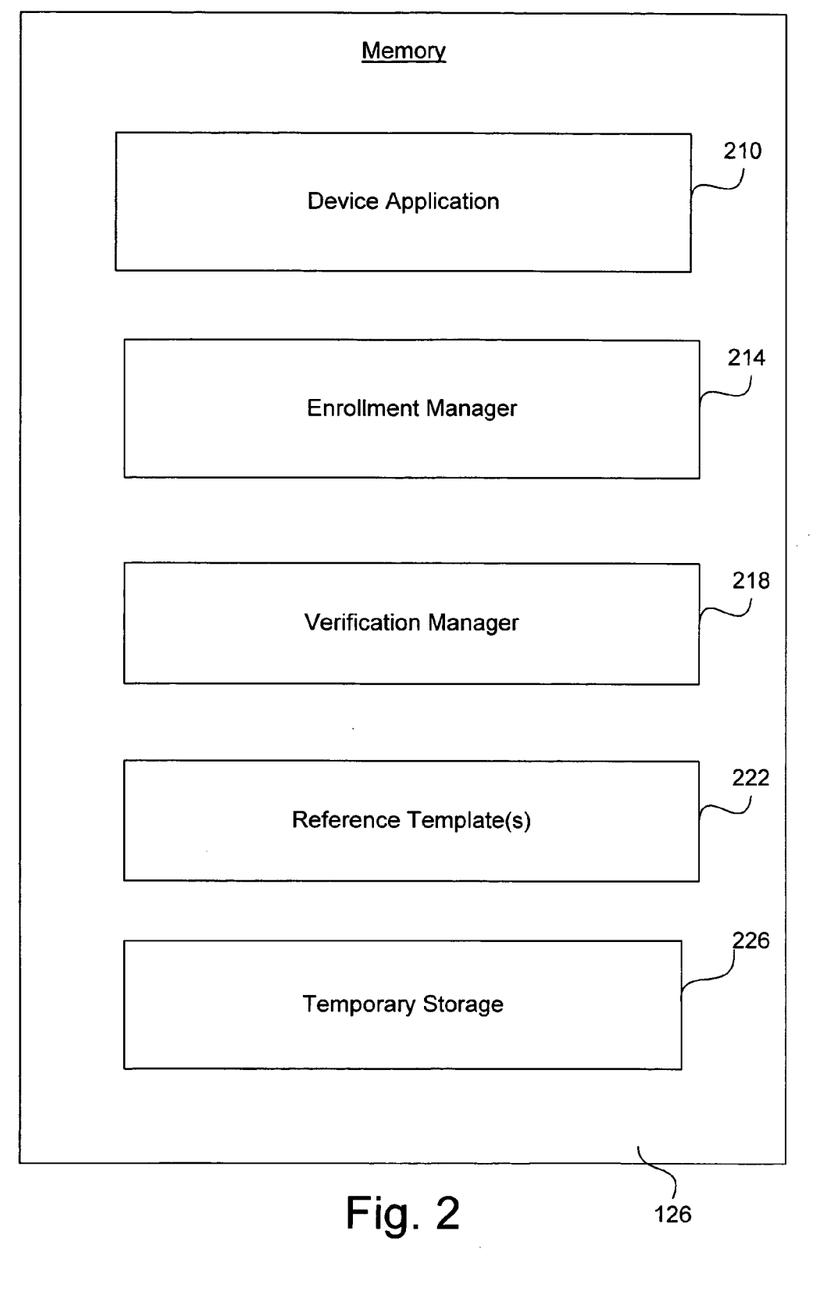
FIG. 2 is a block diagram for one embodiment of the memory of FIG. 1, in accordance with the present invention.

Referring now to FIG. 2, a block diagram for one embodiment of the FIG. 1 memory 126 is shown, in accordance with the present invention. In the FIG. 2 embodiment, memory 126 may preferably include, but is not limited to, a device application 210, an enrollment manager 214, a verification manager 218, one or more reference templates 222, and temporary storage 226. In alternate embodiments, memory 126 may readily include various other components in addition to, or instead of, those components discussed in conjunction with the FIG. 2 embodiment.

In the FIG. 2 embodiment, device application 210 may include program instructions that are preferably executed by CPU 122 (FIG. 1) to perform various functions and operations for electronic device 110. The particular nature and functionality of device application 210 typically vary depending upon factors such as the type and particular use of the corresponding electronic device 110.

In the FIG. 2 embodiment, electronic device 110 may utilize enrollment manager 214 for performing an enrollment procedure to create and store one or more reference templates 222 for performing a pattern matching procedure. In the FIG. 2 embodiment, electronic device 110 may utilize verification manager 214 for performing a verification procedure to compare a test image with one of the reference templates 222 to complete the foregoing pattern matching procedure. Temporary storage 226 may provide storage locations on a temporary basis for any appropriate type of information or data. The utilization of enrollment manager 214 and verification manager 218 are further discussed below in conjunction with FIGS. 7-8B.

Figure 3:
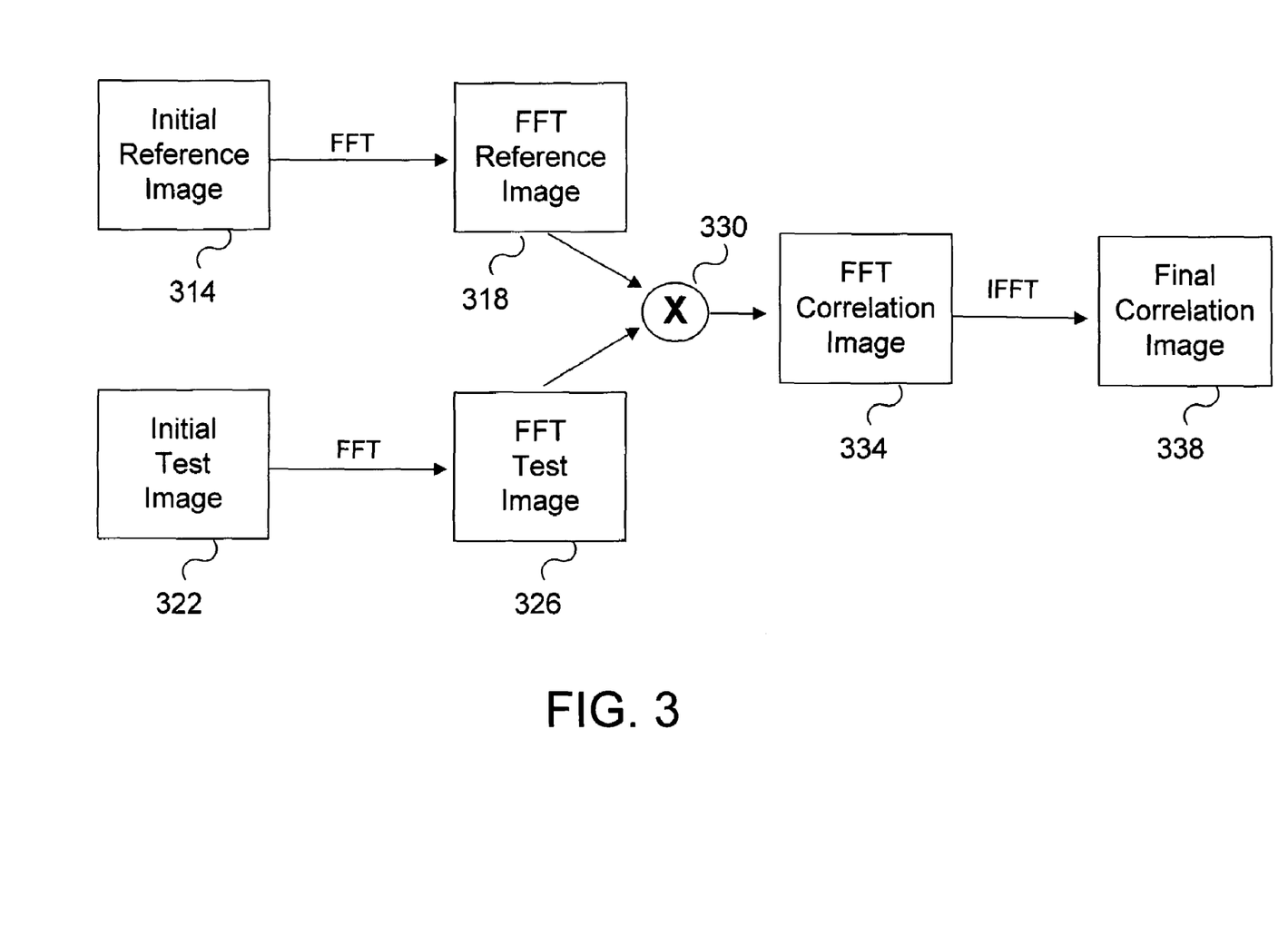
FIG. 3 is a diagram illustrating a pattern matching procedure, in accordance with one embodiment of the present invention.

Referring now to FIG. 3, a diagram for illustrating a pattern matching procedure is shown, in accordance with one embodiment of the present invention. In alternate embodiments of the present invention, pattern matching procedures may readily utilize various techniques that are different from those discussed in conjunction with the FIG. 3 embodiment.

In the FIG. 3 embodiment, during an enrollment procedure, an enrollment manager 214 obtains an initial reference image 314 from any appropriate source. For example, capture subsystem 118 may capture an initial reference image 314 corresponding to any desired identification pattern. In certain embodiments, the initial reference image 314 may correspond to a given individual's fingerprint or face.

In the FIG. 3 embodiment, enrollment manager 214 may perform a Fast Fourier Transform (FFT) procedure to convert initial reference image 314 (having individual pixels expressed as real numbers in the spatial domain) into an FFT reference image 318 (having individual pixel values expressed as complex numbers in the frequency domain). In certain embodiments, enrollment manager 214 may perform a binarization procedure to convert the complex pixel values (with both real and imaginary values) from FFT reference image 318 into corresponding binarized pixel values of a binarized reference image.

In a first binarization step, in order to conserve system resources such as processing requirements and memory, enrollment manager 214 may substitute a decimal value of "1" for all complex coefficients greater than or equal to zero, and may also substitute a decimal value of "−1" for all complex coefficients less than zero. For example, a complex pixel value of "3+j" would therefore be converted to a initial binarization value of "1+j" during the foregoing initial binarization step. The foregoing initial binarization values may then be utilized for any further calculations during the pixel matching procedure.

In a second binarization step, for purposes of conserving storage in memory 126, enrollment manager 214 may create stored binarization values by substituting a binary value of "1" for all complex coefficients of the initial binarization values that are equal to "−1", and also by substituting a binary value of "0" for all complex coefficients of the initial binarization values that are equal to "1". Each of the complex coefficients may thus efficiently and effectively be expressed with a single binary bit. Enrollment manager 214 or verification manager 218 may preferably convert the stored binarization values into initial binarization values for purposes of performing any required mathematical calculations using FFT reference image 318.

In the FIG. 3 embodiment, due to properties of data subject to Fast Fourier Transforms, FFT reference image 318 (or the foregoing binarized reference image) exhibits symmetrical characteristics across the complex pixel values. In certain embodiments, in order to conserve system resources such as processing requirements and memory requirements, enrollment manager 214 may perform a symmetrical reduction procedure on FFT reference image 318 (or on the binarized reference image) to produce a reduced reference image. For example, in certain embodiments, a large portion of the right-hand pixels of FFT reference image 318 (or the binarized reference image) may be discarded before FFT reference image 318 or the binarized reference image is stored as reference template (FIG. 2). The foregoing symmetrical reduction procedure is further discussed below in conjunction with FIG. 4.

In the FIG. 3 embodiment, during a verification procedure, a verification manager 218 obtains an initial test image 322 from any appropriate source. For example, capture subsystem 118 may capture an initial test image 322 corresponding to any desired identification pattern. In certain embodiments, the initial test image 322 may correspond to a given individual's fingerprint or face that is captured to compare with a reference template 222 (FIG. 2) for purposes of verifying that individual's identity.

In the FIG. 3 embodiment, verification manager 218 may perform a Fast Fourier Transform (FFT) procedure to convert initial test image 322 (having individual pixels expressed as real numbers in the spatial domain) into an FFT test image 326 (having individual pixel values expressed as complex numbers in the frequency domain). In certain embodiments, verification manager 218 may perform a binarization procedure to convert the complex pixel values (with both real and imaginary values) from FFT test image 326 into corresponding binarized pixel values from a binarized reference image, as discussed above with reference to FFT reference image 318.

In the FIG. 3 embodiment, due to properties of data subject to Fast Fourier Transforms, FFT test image 326 (or the foregoing binarized test image) exhibits symmetrical characteristics across the complex pixel values. In certain embodiments, in order to conserve system resources such as processing requirements and memory requirements, verification manager 218 may perform a symmetrical reduction procedure on FFT test image 326 (or on the binarized test image) to produce a reduced test image. For example, in certain embodiments, a large portion of the right-hand pixels of FFT test image 326 (or the binarized test image) may be discarded before FFT test image 326 or the binarized test image is stored. The foregoing symmetrical reduction procedure is further discussed below in conjunction with FIG. 4.

In the FIG. 3 embodiment, verification manager 218 may then perform a multiplication procedure by multiplying corresponding complex pixel values from FFT reference 318 (or the reduced reference image) and FFT test image 326 (or the reduced test image) to produce an FFT correlation image 334. In certain embodiments, verification manager 218 may efficiently utilize a multiplication lookup table to perform the multiplication procedure, as discussed below in conjunction with FIG. 5. In appropriate instances, verification manager 218 may perform a symmetrical regeneration procedure to regenerate a full FFT correlation image from a reduced FFT correlation image.

In the FIG. 3 embodiment, verification manager 218 may perform an inverse FFT (IFFT) procedure to convert FFT correlation image 334 (in the frequency domain) into a final correlation image 338 (in the spatial domain). In certain embodiments, verification manager 218 may then discard all imaginary portions of the pixel values from final correlation image 338 to produce a real correlation image. Verification manager 218 may perform a known FFT shift procedure upon pixels from the real correlation image to center a pixel magnitude peak of a corresponding correlation graph that is further discussed below in conjunction with FIG. 6.

Verification manager 218 may then compute a peak sidelobe ratio (PSR) value that represents a relative amount of correlation between a given initial reference image 314 and a given initial test image 322. If the foregoing PSR is over a pre-determined verification threshold value, then verification manager 218 may approve the particular test image 322 as a pattern match for the corresponding initial reference image 314 to complete the pattern matching procedure. The foregoing techniques therefore provide an improved system and method for efficiently performing a pattern matching procedure, in accordance with the present invention.

Figure 4:
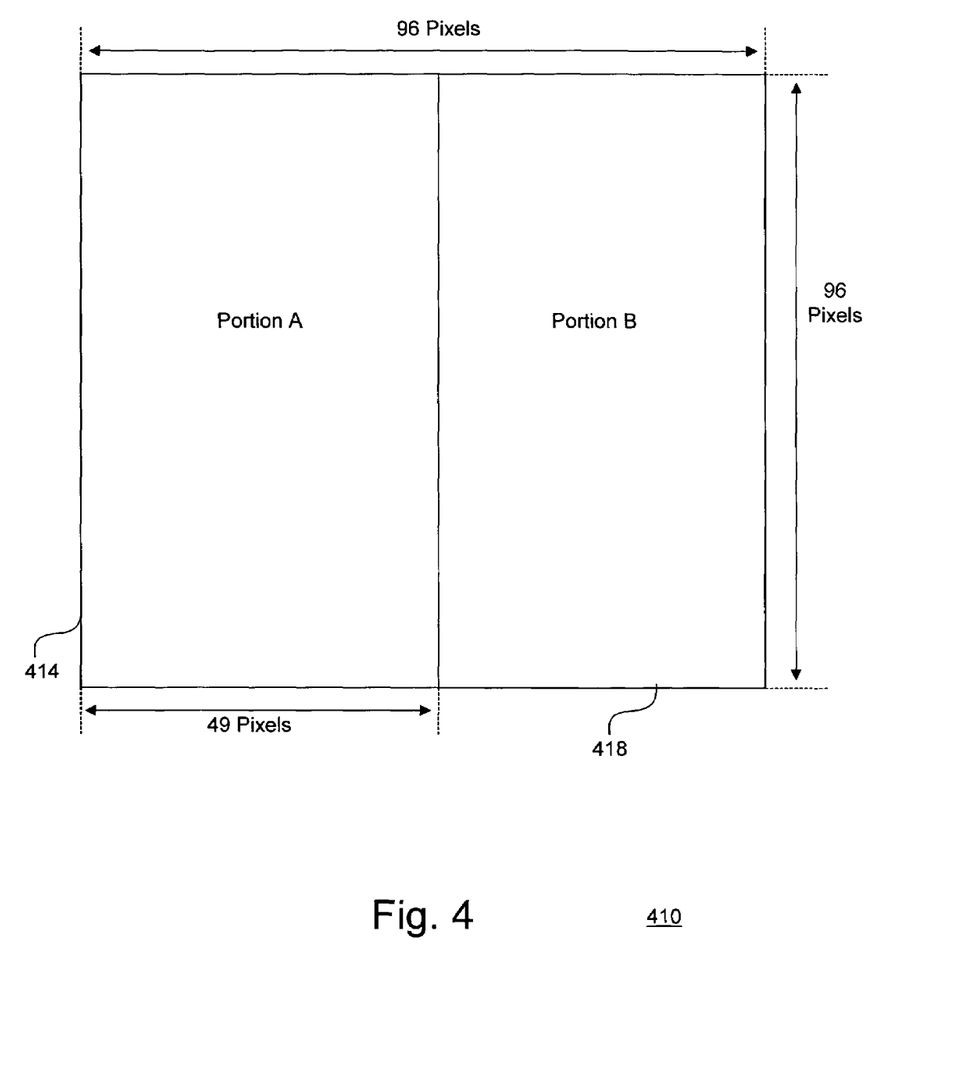
FIG. 4 is a diagram illustrating one embodiment of a symmetrical reduction procedure, in accordance with the present invention.

Referring now to FIG. 4, a diagram 410 illustrating one embodiment of a symmetrical reduction procedure is shown, in accordance with the present invention. In alternate embodiments, symmetrical reduction procedures may utilize various techniques that are different from those discussed in conjunction with the FIG. 4 embodiment.

In the FIG. 4 embodiment, due to properties of frequency domain data that has been processed with Fast Fourier Transforms, an FFT image (such as that shown in diagram 410) preferably exhibits symmetrical characteristics across the individual complex pixel values. In certain embodiments, in order to conserve system resources such as processing requirements and memory use, an electronic device 110 or other appropriate entity may perform a symmetrical reduction procedure on the FFT image to produce a reduced FFT image.

In the FIG. 4 embodiment, for purposes of illustration, the FFT image of diagram 410 is shown to be 96 pixels wide and 96 pixels high. During a symmetrical reduction procedure, because of the symmetrical characteristics of the FFT image from left to right, the FFT image may be divided into a reduced portion A 414 on the left of the FFT image, and a discarded portion B 418 on the right of the FFT image. In the FIG. 4 embodiment, reduced portion A 414 may be 49 pixels wide, and discarded portion B may be 47 pixels wide. In certain embodiments, the discarded pixels corresponding to discarded portion B 418 may advantageously be regenerated by verification manager 218 in a symmetrical regeneration procedure that is performed by utilizing the same symmetrical characteristics and properties of frequency domain data processed with Fast Fourier Transforms.

Figure 5:
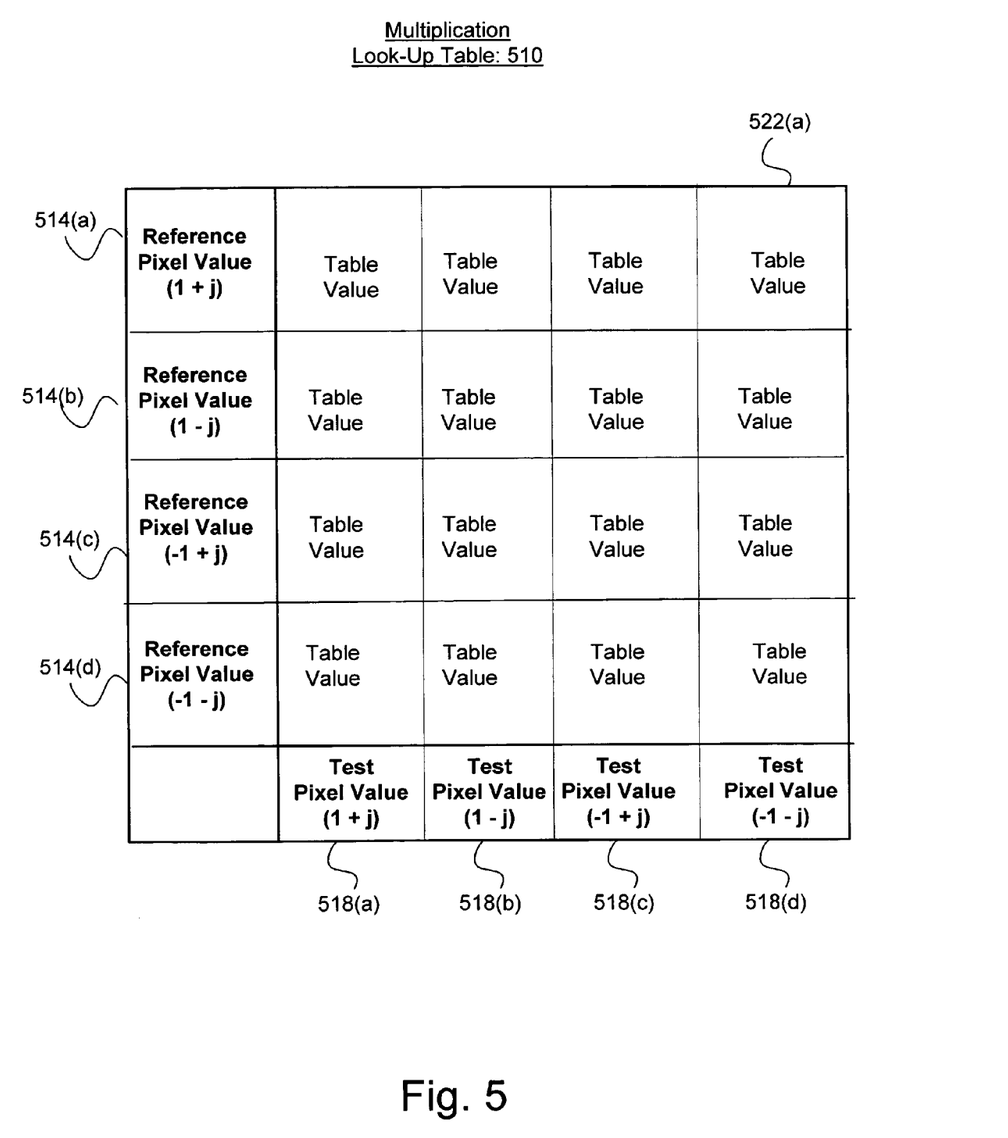
FIG. 5 is a diagram for one embodiment of a multiplication lookup table, in accordance with the present invention.

Referring now to FIG. 5, a diagram for one embodiment of a multiplication lookup table 510 is shown, in accordance with the present invention. The multiplication look-up table (multiplication LUT) 510 of FIG. 5 is presented for purposes of illustration, and in alternate embodiments of the present invention, multiplication lookup table 510 may readily include other elements and components in various configurations that are different from that discussed in conjunction with the FIG. 5 embodiment.

In the FIG. 5 example, as also discussed above in conjunction with FIG. 3, verification manager 218 may perform a multiplication procedure by multiplying pixel values from a reference template 222 (FIG. 2) with corresponding pixel values from an FFT test image 326 to produce an FFT correlation image 334. In the FIG. 5 embodiment, to conserve system resources such as processing and memory utilization, verification manager 218 may efficiently utilize multiplication LUT 510 to perform the foregoing multiplication procedure.

In the FIG. 5 embodiment, due to the binarization procedure discussed above in conjunction with FIG. 3, all complex values from either reference template 222 or FFT test image 326 may be expressed with one of only four complex numbers (either 1+j, 1−j, −1+j, or −1−j). In the FIG. 5 embodiment, multiplication LUT 510 may thus be efficiently implemented with only sixteen table values. In the FIG. 5 embodiment, a vertical reference-pixel index column includes a reference pixel value (1+j) (514(a)), a reference pixel value (1−j) (514(b)), a reference pixel value (−1+j) (514(c)), and a reference pixel value (−1−j) (514(d)).

Similarly, a horizontal test-pixel index row includes a test pixel value (1+j) (518(a)), a test pixel value (1−j) (518(b)), a test pixel value (−1+j) (518(c)), and a test pixel value (−1−j) (518(d)). Verification manager 218 or other appropriate entity may perform the foregoing multiplication procedure by indexing an appropriate table value in multiplication LUT 510. For example, verification manager 218 may locate table value 522(a) with reference pixel value (1+j) (514(a)) and test pixel value (−1−j) (518(d)).

Figure 6:
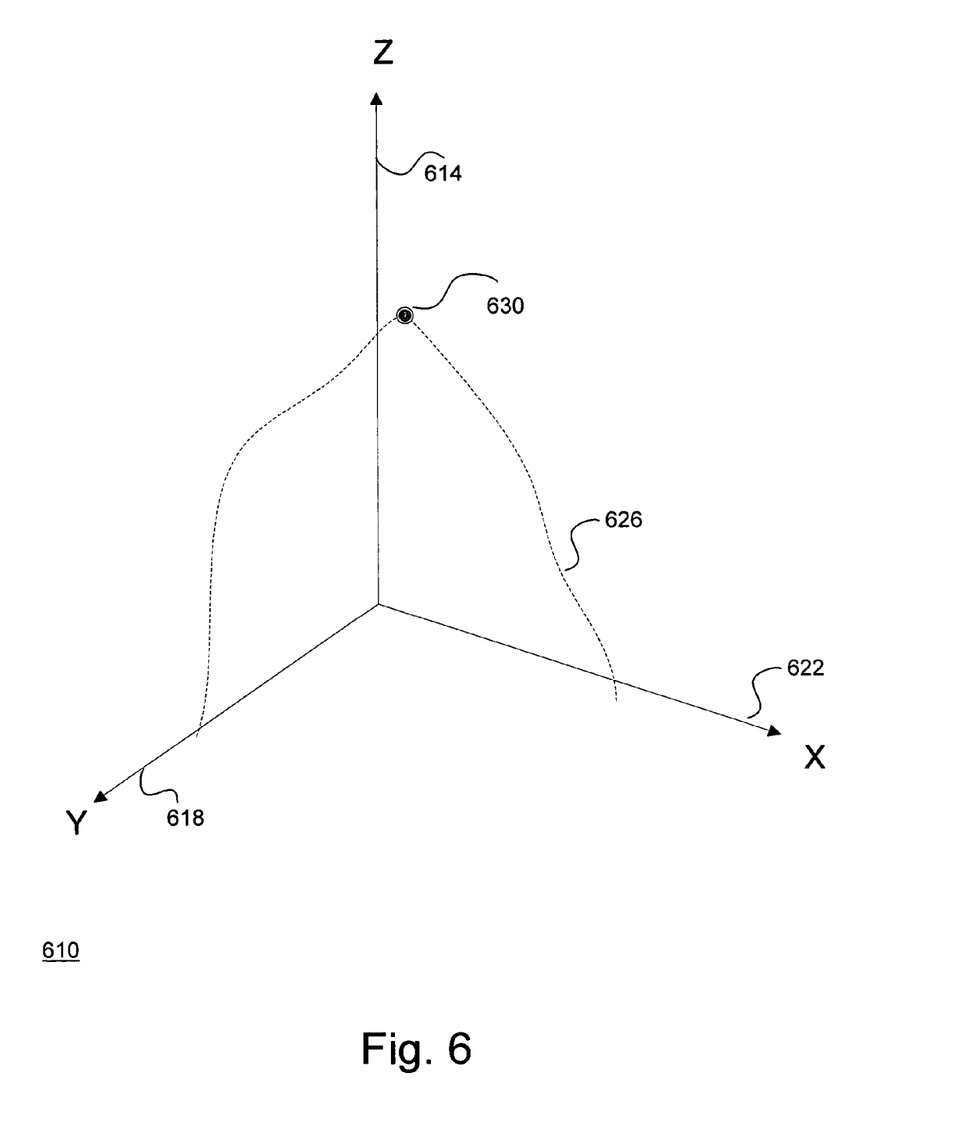
FIG. 6 is a diagram for one embodiment of a correlation graph, in accordance with the present invention.

Referring now to FIG. 6, a diagram for one embodiment of a correlation graph 610 is shown, in accordance with the present invention. The correlation graph 610 of FIG. 6 is presented for purposes of illustration, and in alternate embodiments of the present invention, correlation graph 610 may readily include other elements and components in various configurations that are different from those discussed in conjunction with the FIG. 6 embodiment.

In the FIG. 6 embodiment, correlation graph 610 is shown as a three-dimensional graph that includes a vertical Z axis 614 corresponding to pixel magnitudes. Correlation graph 610 also includes a horizontal X axis 622 and a horizontal Y axis 618 that correspond to respective vertical X and horizontal Y pixel coordinates from a given correlation image. In the FIG. 6 example, correlation graph 610 includes a correlation curve 626 that represents pixel values from a final correlation image 338 (FIG. 3) or other correlation image created from an initial reference image 314 and an initial test image 322. In the FIG. 6 embodiment, correlation curve 626 includes a peak value 630 that represents a maximum correlation pixel that has the greatest magnitude.

Verification manager 218 may utilize pixel values from correlation graph 610 to calculate a peak side-lobe ration (PSR) for verifying or rejecting a given initial test image 322 as a pattern match for a corresponding reference template 222, as discussed above in conjunction with FIG. 3.

In certain embodiments, the foregoing PSR may be calculated according to the following formula:

$$PSR=(\text{Peak Value}-\text{Mean Value})/STD$$

where PSR is the peak side-lobe ratio, Peak Value is a correlation image pixel with the greatest magnitude, Mean Value is an arithmetical mean value of correlation image pixels in a pre-defined side-lobe area surrounding the foregoing peak value 630, and STD is the standard deviation of correlation image pixels in the pre-defined side-lobe area. The creation and utilization of correlation graph 610 is further discussed below in conjunction with FIG. 8B.

Figure 7:
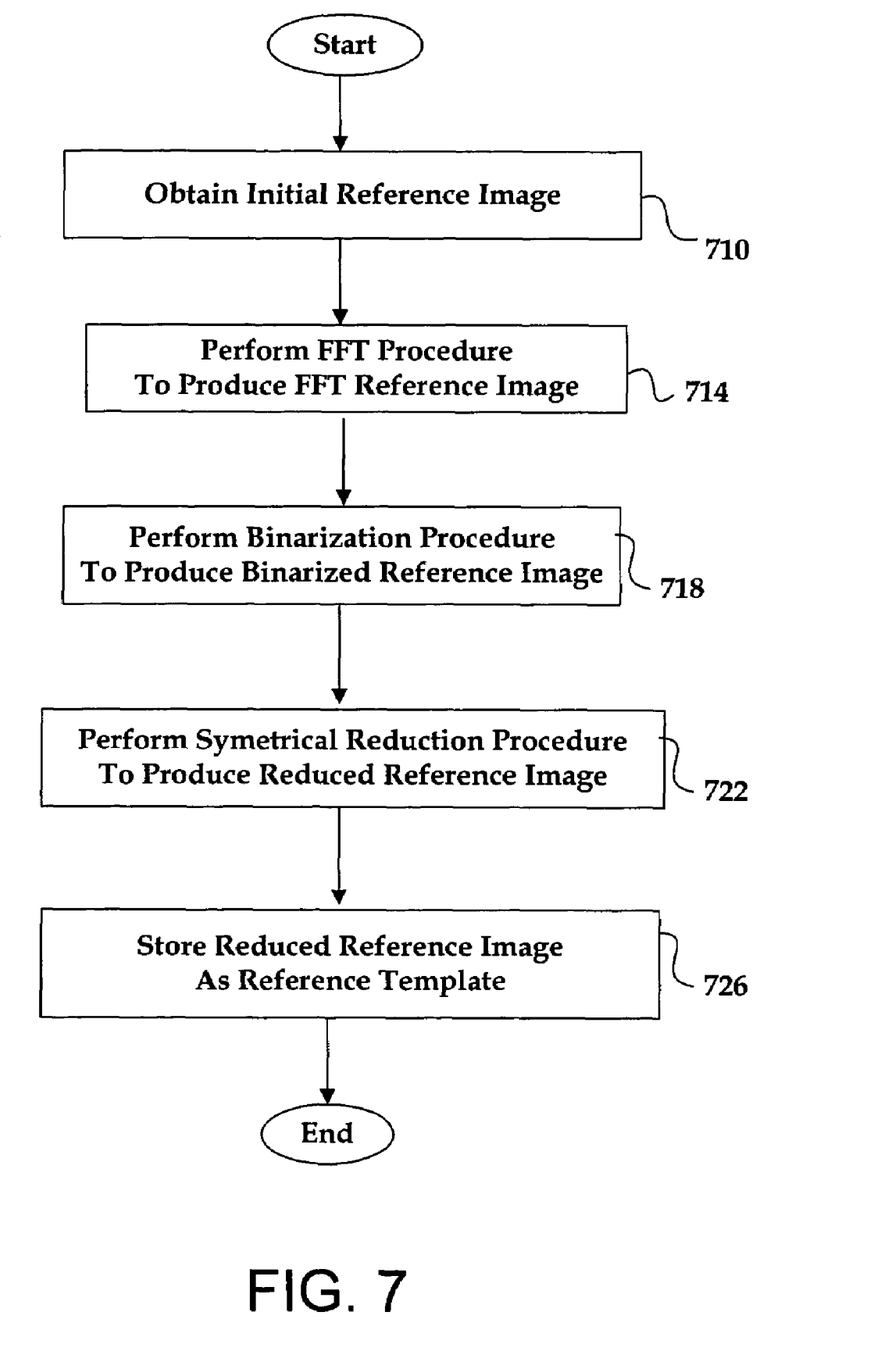
FIG. 7 is a flowchart of method steps for performing an enrollment procedure, in accordance with one embodiment of the present invention.

Referring now to FIG. 7, a flowchart of method steps for performing an enrollment procedure is shown, in accordance with one embodiment of the present invention. The FIG. 7 embodiment is presented for purposes of illustration, and in alternate embodiments, the present invention may readily utilize various other steps and sequences than those discussed in conjunction with the FIG. 7 embodiment.

In the FIG. 7 embodiment, in step 710, an initial reference image 314 (FIG. 3) may be obtained from any appropriate image source. Then, in step 714, an enrollment manager 214 may perform a Fast Fourier Transform (FFT) procedure upon initial reference image 314 to produce an FFT reference image 318. In accordance with certain embodiments of the present invention, in step 718, enrollment manager 214 may next perform a binarization procedure upon FFT reference image 318 to produce a binarized reference image, as discussed above in conjunction with FIG. 3.

In step 722, enrollment manager 214 may perform a symmetrical reduction procedure upon the binarized reference image to produce a reduced reference image, as discussed above in conjunction with FIGS. 3-4. Finally, in step 726, enrollment manager 214 may store the reduced reference image into memory 126 as a reference template 222. The FIG. 7 process may then terminate.

Figure 8A:
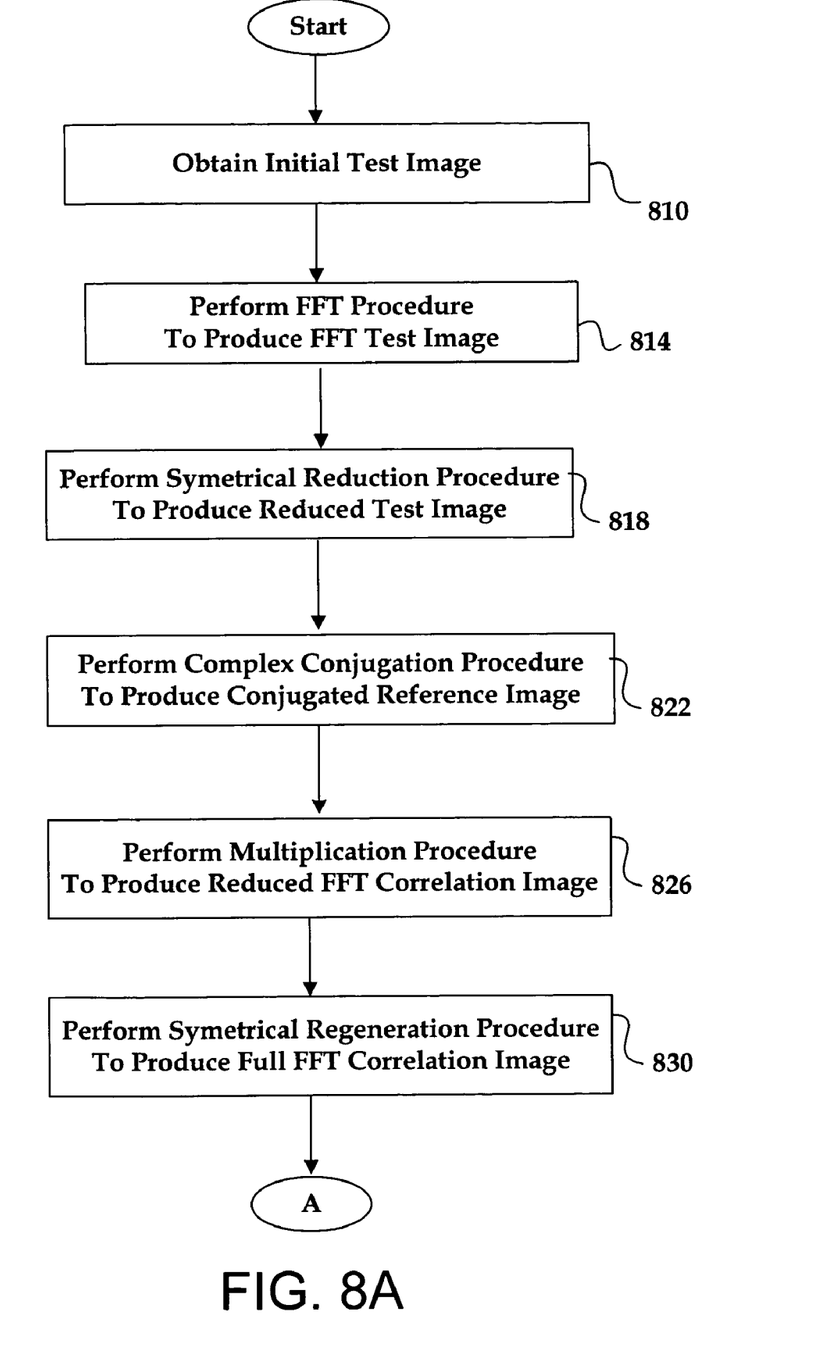
FIGS. 8A and 8B are flowcharts of method steps for performing a verification procedure, in accordance with one embodiment of the present invention.
Figure 8B:
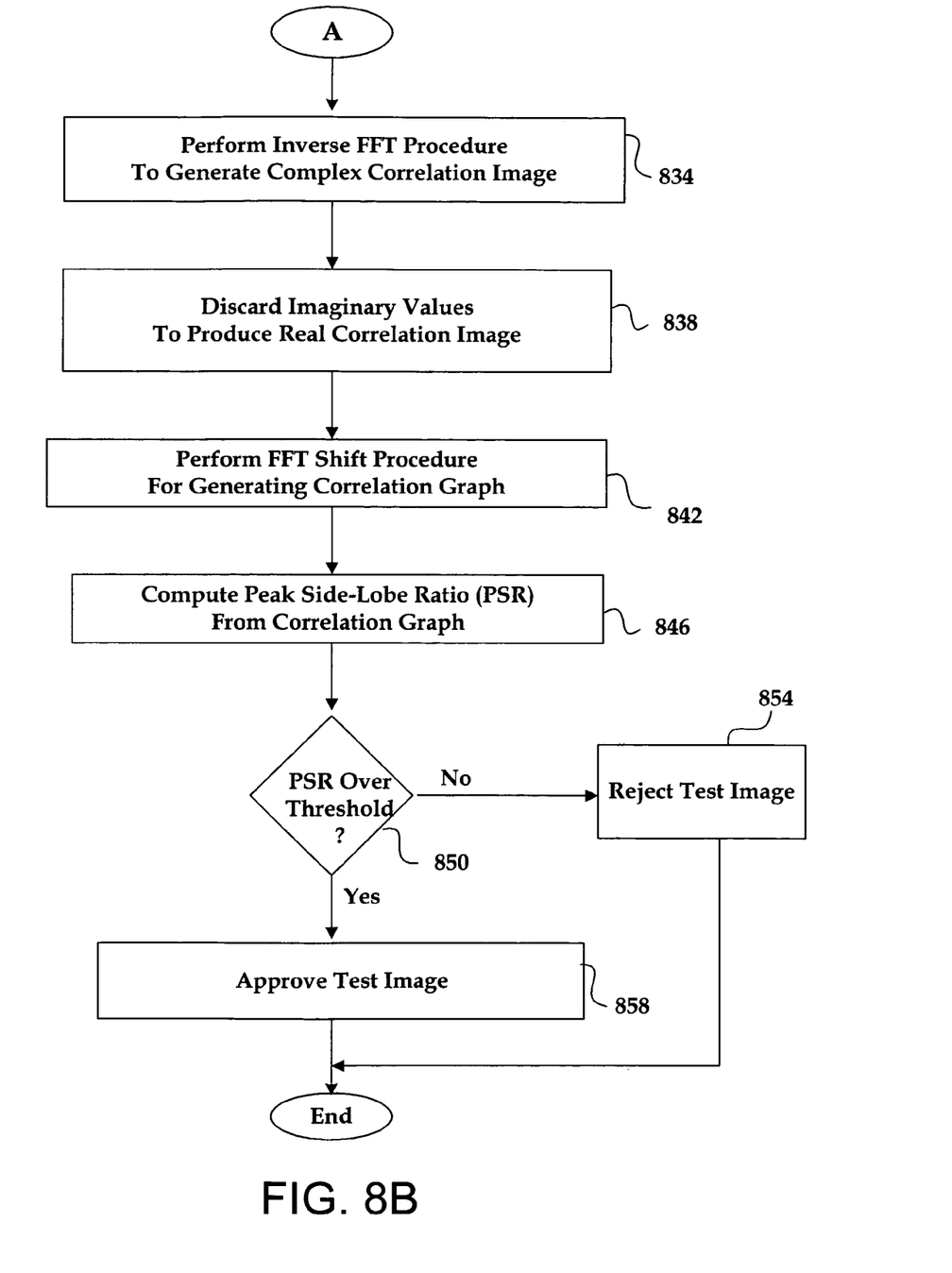

Referring now to FIGS. 8A and 8B, a flowchart of method steps for performing a verification procedure is shown, in accordance with one embodiment of the present invention. The FIGS. 8A and 8B embodiment is presented for purposes of illustration, and in alternate embodiments, the present invention may readily utilize various other steps and sequences than those discussed in conjunction with FIGS. 8A and 8B.

In FIG. 8A, in step 810, an initial test image 322 (FIG. 3) may be obtained from any appropriate image source. Then, in step 814, a verification manager 218 performs a Fast Fourier Transform (FFT) procedure upon initial test image 322 to produce an FFT test image 326. In accordance with certain embodiments of the present invention, in step 814, verification manager 218 may also perform a binarization procedure upon FFT test image 326 to produce a binarized reference image, as discussed above in conjunction with FIG. 3.

In step 818, verification manager 218 performs a symmetrical reduction procedure upon FFT test image 326 (or the foregoing binarized test image) to produce a reduced test image, as discussed above in conjunction with FIGS. 3-4. Then, in step 822, verification manager 218 or other appropriate entity may perform a complex conjugation procedure upon the reference template 222 generated by the process discussed above in conjunction with FIG. 7 to thereby produce a conjugated reference image.

In the FIG. 8A embodiment, the foregoing complex conjugation procedure simply converts each pixel value from a reference template 222 into a corresponding complex conjugate value by changing the arithmetic operation that connects real and imaginary portions of the complex values for each pixel in reference template 222. For example, a "plus" sign is changed to a "minus" sign, and similarly, a "minus" sign is changed to a "plus" sign.

In step 826, verification manager 218 performs a multiplication procedure with the foregoing conjugated reference image and the foregoing reduced test image to produce a reduced FFT correlation image, as discussed above in conjunction with FIGS. 3 and 5. Then, in step 830, verification manager 218 performs a symmetrical regeneration procedure to produce a full FFT correlation image, as discussed above in conjunction with FIGS. 3 and 4.

The FIG. 8A process then proceeds to step 834 of FIG. 8B in which verification manager 218 performs an inverse FFT procedure upon the foregoing full FFT correlation image to generate a complex correlation image. In step 838, verification manager 218 discards imaginary values from each pixel value of the complex correlation image to produce a real correlation image. In step 842, verification manager 218 performs an FFT shift procedure to generate a correlation graph 610 that represents pixels from the real correlation image, as discussed above in conjunction with FIGS. 3 and 6.

In step 846, verification manager 218 then computes a peak side-lobe ratio (PSR) from correlation graph 610, as discussed above in conjunction with FIG. 6. In step 850, verification manager 218 determines whether the calculated PSR is over a pre-determined verification threshold. If the PSR is not over the pre-determined verification threshold, then in step 854, verification manager 218 rejects initial test image 322 as a pattern match for the corresponding initial reference image 314.

However, in step 858, if the PSR of step 846 is over the pre-determined verification threshold, then verification manager 218 approves initial test image 322 as a pattern match for the corresponding initial reference image 314, and the FIG. 8B process may terminate. The present invention therefore provides an improved system and method for efficiently performing a pattern matching procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for efficiently performing a pattern matching procedure using an electronic apparatus, comprising:
    an enrollment manager that performs an image conversion procedure for converting an initial reference image into a reference template, said image conversion procedure including a binarization procedure and a symmetrical reduction procedure, said binarization procedure converting a non-binary complex number format into a binary number format; and
    a verification manager that converts an initial test image into a transformed test image, said verification manager then combining said reference template and said transformed test image into a correlation image, said verification manager analyzing matching characteristics of said correlation image to determine whether said initial test image matches said initial reference image, said enrollment manager performing a first binarization step to create initial binarization values for said binarization procedure by substituting a decimal value of "1" for all complex coefficients from said initial reference image that are greater than or equal to zero, said enrollment manager also substituting a decimal value of "−1" for all of said complex coefficients that are less than zero, said initial binarization values then being utilized for any further calculations during said pattern matching procedure, said enrollment manager performing a second binarization step to create stored binarization values for said binarization procedure by substituting a binary value of "1" for all of said complex coefficients from said initial binarization values that are equal to "−1", and by also substituting a binary value of "0" for all of said complex coefficients from said initial binarization values that are equal to "1", said complex coefficients thus each being expressed with a single binary bit, said stored binarization values subsequently being converted into said initial binarization values for performing any required mathematical calculations.

2. A system for efficiently performing a pattern matching procedure using an electronic apparatus, comprising:
    an enrollment manager that performs an image conversion procedure for converting an initial reference image into a reference template, said image conversion procedure including a binarization procedure and a symmetrical reduction procedure, said binarization procedure converting a non-binary complex number format into a binary number format; and
    a verification manager that converts an initial test image into a transformed test image, said verification manager then combining said reference template and said transformed test image into a correlation image, said verification manager analyzing matching characteristics of said correlation image to determine whether said initial test image matches said initial reference image, said verification manager creating said correlation image by performing a multiplication procedure that multiplies corresponding pixel values from said reference template and said transformed test image to produce correlation pixel values for said correlation image, said correlation pixel values being obtained from a multiplication lookup table to conserve system resources such as processing requirements and memory requirements.

3. The system of claim 2 wherein said multiplication lookup table is implemented with initial binarization values from said binarization procedure, each complex value from said reference template and said transformed test image being expressed with one of only four complex numbers, said four complex numbers being "1+j", "1−j", "−1+j", and "−1−j", said multiplication lookup table including a vertical reference-pixel index column having a first reference pixel value (1+j), a second reference pixel value (1−j), a third reference pixel value (−1+j), and a fourth reference pixel value (−1−j), said multiplication lookup table also including a horizontal test-pixel index row having a first test pixel value (1+j), a second test pixel value (1−j), a third test pixel value (−1+j), and a fourth test pixel value (−1−j).

4. A system for efficiently performing a pattern matching procedure using an electronic apparatus, comprising:
    an enrollment manager that performs an image conversion procedure for converting an initial reference image into a reference template, said image conversion procedure including a binarization procedure and a symmetrical reduction procedure, said binarization procedure converting a non-binary complex number format into a binary number format; and
    a verification manager that converts an initial test image into a transformed test image, said verification manager then combining said reference template and said transformed test image into a correlation image, said verification manager analyzing matching characteristics of said correlation image to determine whether said initial test image matches said initial reference image, said enrollment manager performing a discrete symmetrical reduction procedure upon said binarized reference image to produce a reduced reference image which said enrollment manager stores as said reference template.

5. A system for efficiently performing a pattern matching procedure using an electronic apparatus, comprising:
    an enrollment manager that performs an image conversion procedure for converting an initial reference image into a reference template, said image conversion procedure including a binarization procedure and a symmetrical reduction procedure, said binarization procedure converting a non-binary complex number format into a binary number format; and
    a verification manager that converts an initial test image into a transformed test image, said verification manager then combining said reference template and said transformed test image into a correlation image, said verification manager analyzing matching characteristics of said correlation image to determine whether said initial test image matches said initial reference image, said verification manager converting said initial test image into an FFT test image by performing a single Fast Fourier Transform procedure upon said initial test image, said verification manager performing a two-step binarization procedure upon said FFT test image to produce a binarized test image that is stored with a single binary bit representing each complex pixel value coefficient, said verification manager performing a symmetrical reduction procedure upon said FFT test image to produce and store a reduced test image, said verification manager performing a complex conjugation procedure upon said reference template to produce a conjugated reference image, said complex conjugation procedure converting each pixel value from said reference template into a corresponding complex conjugate value by inverting an arithmetic operation that connects real and imaginary portions of complex values for said each pixel value from said reference template.

6. The system of claim 5 wherein said verification manager performs a multiplication procedure with said conjugated reference image and said reduced test image to produce a reduced correlation image.

7. The system of claim 6 wherein said verification manager performs said multiplication procedure by referencing a multiplication lookup table to index pixel values from said conjugated reference image and said reduced test image to produce corresponding correlation pixel values for said reduced correlation image.

8. The system of claim 6 wherein said verification manager performs a symmetrical regeneration procedure upon said reduced correlation image to produce a full FFT correlation image.

9. The system of claim 8 wherein said verification manager performs an inverse FFT procedure upon said full FFT correlation image to generate a complex correlation image, said verification manager discarding imaginary values from each pixel value of said complex correlation image to produce a real correlation image, said verification manager then performing an FFT shift procedure to generate a correlation graph that represents pixels from said real correlation image.

10. The system of claim 9 wherein said verification manager computes a peak side-lobe ratio from said correlation graph for comparing with a pre-determined correlation threshold to determine whether said initial test image matches said initial reference image, said peak side-lobe ratio being expressed by a formula:

$$PSR = (Peak\ Value - Mean\ Value)/STD$$

where said PSR is said peak side-lobe ratio, said Peak Value is a correlation image pixel with a greatest magnitude, said Mean Value is an arithmetical mean value of correlation image pixels in a pre-defined side-lobe area surrounding said Peak Value, and said STD is a standard deviation of said correlation image pixels in said pre-defined side-lobe area.

11. A method for efficiently performing a pattern matching procedure, comprising:
    performing an image conversion procedure with an enrollment manager to convert an initial reference image into a reference template, said image conversion procedure including a binarization procedure and a symmetrical reduction procedure, said binarization procedure converting a non-binary complex number format into a binary number format;
    converting an initial test image into a transformed test image with a verification manager;
    combining said reference template and said transformed test image into a correlation image with said verification manager; and
    analyzing matching characteristics of said correlation image with said verification manager to determine whether said initial test image matches said initial reference image, said enrollment manager performing a first binarization step to create initial binarization values for said binarization procedure by substituting a decimal value of "1" for all complex coefficients from said initial reference image that are greater than or equal to zero, said enrollment manager also substituting a decimal value of "−1" for all of said complex coefficients that are less than zero, said initial binarization values then being utilized for any further calculations during said pattern matching procedure, said enrollment manager performing a second binarization step to create stored binarization values for said binarization procedure by substituting a binary value of "1" for all of said complex coefficients from said initial binarization values that are equal to "−1", and by also substituting a binary value of "0" for all of said complex coefficients from said initial binarization values that are equal to "1", said complex coefficients thus each being expressed with a single binary bit, said stored binarization values subsequently being converted into said initial binarization values for performing any required mathematical calculations.

12. A method for efficiently performing a pattern matching procedure, comprising:

performing an image conversion procedure with an enrollment manager to convert an initial reference image into a reference template, said image conversion procedure including a binarization procedure and a symmetrical reduction procedure, said binarization procedure converting a non-binary complex number format into a binary number format;

converting an initial test image into a transformed test image with a verification manager;

combining said reference template and said transformed test image into a correlation image with said verification manager; and analyzing matching characteristics of said correlation image with said verification manager to determine whether said initial test image matches said initial reference image, said verification manager creating said correlation image by performing a multiplication procedure that multiplies corresponding pixel values from said reference template and said transformed test image to produce correlation pixel values for said correlation image, said correlation pixel values being obtained from a multiplication lookup table to conserve system resources such as processing requirements and memory requirements.

13. The method of claim 12 wherein said multiplication lookup table is implemented with initial binarization values from said binarization procedure, each complex value from said reference template and said transformed test image being expressed with one of only four complex numbers, said four complex numbers being "1+j", "1−j", "−1+j", and "−1−j", said multiplication lookup table including a vertical reference-pixel index column having a first reference pixel value (1+j), a second reference pixel value (1−j), a third reference pixel value (−1+j), and a fourth reference pixel value (−1−j), said multiplication lookup table also including a horizontal test-pixel index row having a first test pixel value (1+j), a second test pixel value (1−j), a third test pixel value (−1+j), and a fourth test pixel value (−1−j).

14. A method for efficiently performing a pattern matching procedure, comprising:

performing an image conversion procedure with an enrollment manager to convert an initial reference image into a reference template, said image conversion procedure including a binarization procedure and a symmetrical reduction procedure, said binarization procedure converting a non-binary complex number format into a binary number format;

converting an initial test image into a transformed test image with a verification manager;

combining said reference template and said transformed test image into a correlation image with said verification manager; and analyzing matching characteristics of said correlation image with said verification manager to determine whether said initial test image matches said initial reference image, said enrollment manager performing a discrete symmetrical reduction procedure upon said binarized reference image to produce a reduced reference image which said enrollment manager stores as said reference template.

15. A method for efficiently performing a pattern matching procedure, comprising:

performing an image conversion procedure with an enrollment manager to convert an initial reference image into a reference template, said image conversion procedure including a binarization procedure and a symmetrical reduction procedure, said binarization procedure converting a non-binary complex number format into a binary number format;

converting an initial test image into a transformed test image with a verification manager;

combining said reference template and said transformed test image into a correlation image with said verification manager; and analyzing matching characteristics of said correlation image with said verification manager to determine whether said initial test image matches said initial reference image, said verification manager converting said initial test image into an FFT test image by performing a single Fast Fourier Transform procedure upon said initial test image, said verification manager performing a two-step binarization procedure upon said FFT test image to produce a binarized test image that is stored with a single binary bit representing each complex pixel value coefficient, said verification manager performing a symmetrical reduction procedure upon said FFT test image to produce and store a reduced test image, said verification manager performing a complex conjugation procedure upon said reference template to produce a conjugated reference image, said complex conjugation procedure converting each pixel value from said reference template into a corresponding complex conjugate value by inverting an arithmetic operation that connects real and imaginary portions of complex values for said each pixel value from said reference template.

16. The method of claim 15 wherein said verification manager performs a multiplication procedure with said conjugated reference image and said reduced test image to produce a reduced correlation image.

17. The method of claim 16 wherein said verification manager performs said multiplication procedure by referencing a multiplication lookup table to index pixel values from said conjugated reference image and said reduced test image to produce corresponding correlation pixel values for said reduced correlation image.

18. The method of claim 16 wherein said verification manager performs a symmetrical regeneration procedure upon said reduced correlation image to produce a full FFT correlation image.

19. The method of claim 18 wherein said verification manager performs an inverse FFT procedure upon said full FFT correlation image to generate a complex correlation image, said verification manager discarding imaginary values from each pixel value of said complex correlation image to produce a real correlation image, said verification manager then performing an FFT shift procedure to generate a correlation graph that represents pixels from said real correlation image.

20. The method of claim 19 wherein said verification manager computes a peak side-lobe ratio from said correlation graph for comparing with a pre-determined correlation threshold to determine whether said initial test image matches said initial reference image, said peak side-lobe ratio being expressed by a formula:

$$PSR = (\text{Peak Value} - \text{Mean Value})/STD$$

where said PSR is said peak side-lobe ratio, said Peak Value is a correlation image pixel with a greatest magnitude, said Mean Value is an arithmetical mean value of correlation image pixels in a pre-defined side-lobe area surrounding said Peak Value, and said STD is a standard deviation of said correlation image pixels in said pre-defined side-lobe area.

* * * * *

UNITED STATES PATENT AND TRADEMARK OFFICE
CERTIFICATE OF CORRECTION

PATENT NO. : 7,634,139 B2
APPLICATION NO. : 10/802088
DATED : December 15, 2009
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1093 days.

Signed and Sealed this

Ninth Day of November, 2010

David J. Kappos
*Director of the United States Patent and Trademark Office*